United States Patent [19]

Alley

[11] 4,117,373
[45] Sep. 26, 1978

[54] EMERGENCY/NORMAL LIGHTING CIRCUIT FOR A GASEOUS DISCHARGE LAMP

[75] Inventor: Robert P. Alley, Danville, Ill.

[73] Assignee: General Electric Company

[21] Appl. No.: 791,702

[22] Filed: Apr. 28, 1977

[51] Int. Cl.² ............................................. H05B 41/14
[52] U.S. Cl. ........................................ 315/86; 307/66; 315/156; 315/DIG. 7
[58] Field of Search ................ 315/86, 101, 106, 107, 315/120, 156, 159, DIG. 2, DIG. 7; 307/66

[56] References Cited

U.S. PATENT DOCUMENTS 3,657,597   4/1972   Moerkens et al. .................... 315/86
3,890,534   6/1975   Horowitz ........................ 315/159 X
4,008,414   2/1977   Agnew ............................ 315/101 X

FOREIGN PATENT DOCUMENTS 2,135,062   1/1973   Fed. Rep. of Germany ............. 315/86

Primary Examiner—Eugene R. LaRoche
Attorney, Agent, or Firm—Sidney Greenberg

[57] ABSTRACT

A circuit is provided including a reactor for operating a fluorescent lamp from AC line voltage and including a high frequency inverter for operating the lamp from a battery upon failure of line voltage. The inverter also serves to start the lamp during normal conditions, that is, when AC line voltage of sufficient value is available to the lamp.

5 Claims, 1 Drawing Figure

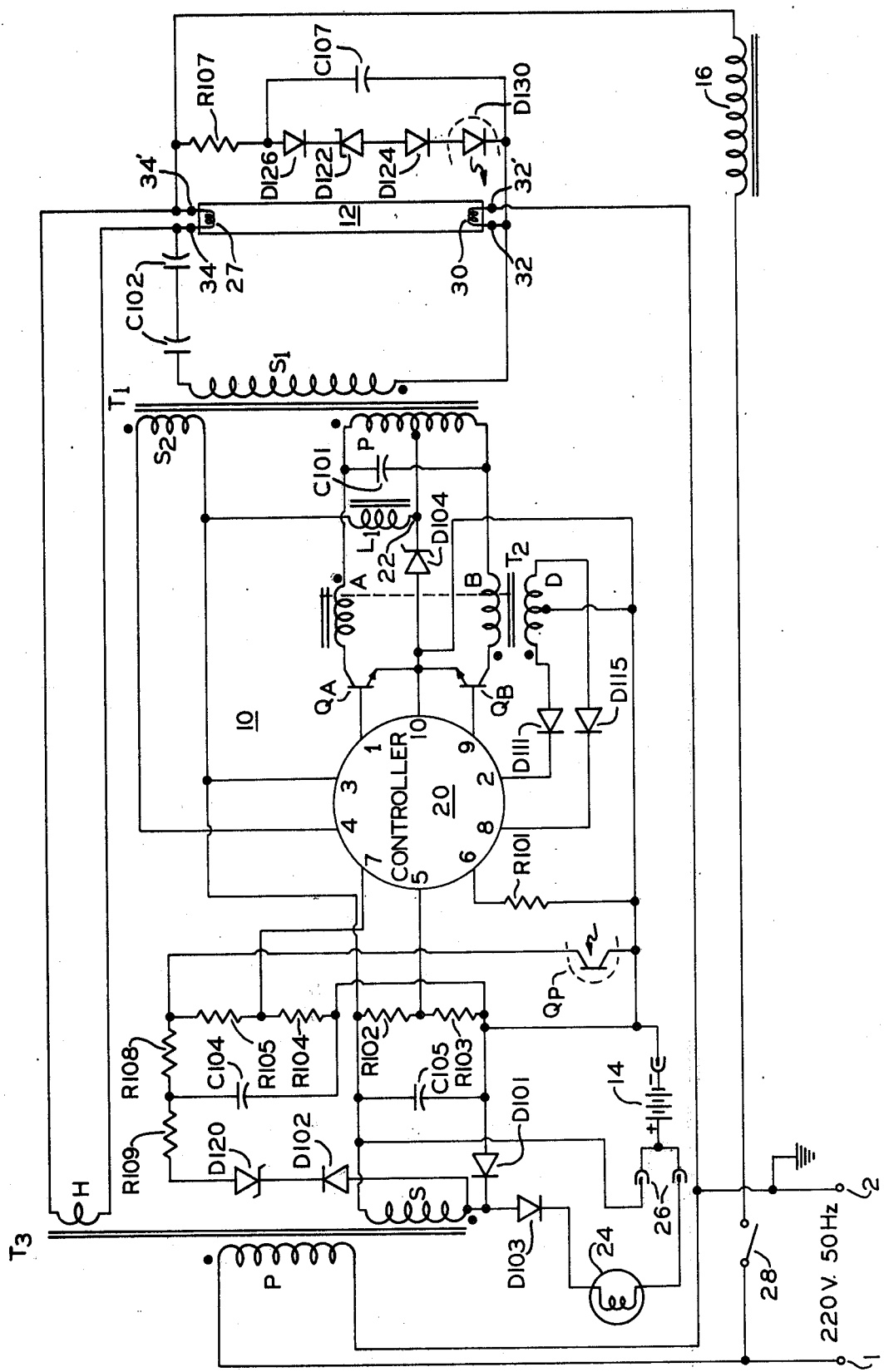

EMERGENCY/NORMAL LIGHTING CIRCUIT FOR A GASEOUS DISCHARGE LAMP

BACKGROUND OF THE INVENTION

1. Field of the Invention

The present invention relates to a circuit for operating a gaseous discharge lamp from the AC means as well as from an auxiliary DC source, and more particularly, to a circuit for operating such a lamp under normal conditions at power frequency from a AC line source of electrical energy in conjunction with a reactor ballast, and, under emergency conditions, at high frequency from an inverter powered by an auxiliary DC electrical energy source.

II. Description of the Prior Art

A power failure, no matter what the cause may be, may very well jeopardize human life due to lighting system failure. There are therefore, many installations which require some type of emergency lighting system which will automatically come into operation upon the occurrence of a power failure; the high efficiency of a fluorescent lamp makes it especially valuable for use in such a system.

Presently available emergency lighting systems are generally of the type using a transistor switching inverter and wherein a single fluorescent lamp, or group of lamps, is used both for normal AC operation of the lighting system and for the emergency system, a battery being used as the power source for energizing the transistor inverter and the lamp, or lamps, upon loss of AC line voltage. Ideally, such an inverter is of the high efficiency type and is provided with means for controlling its operation; such a system is disclosed and claimed in U.S. Pat. No. 3,921,005 — Watrous, assigned to the assignee of the present invention.

When attempts were made to apply an emergency lighting system, such as for example that described in U.S. Pat. No. 3,906,243 — Herzog, assigned to the assignee of the present invention, to fluorescent lamps in the size range of 20 watts and less for operation in the rapid start mode, the isolated secondary winding of the ballasts was found to have too low an impedance at high frequency. Designing this winding with a sufficiently high impedance makes it large, with too high an open circuit voltage (causes rapid start lamps to instant start) and hence lossy.

Examining other ways of starting fluorescent lamps suggests the use of a manual starter, a gas-filled bi-metal starter or a solid-state equivalent. While the manual starter is compatible with a high frequency emergency inverter, where emergency lighting is needed, a manual starter is not desirable nor suitable. Both the gas-filled bi-metal starter and the solid-state equivalent will act to short out the high frequency inverter rather than start the fluorescent lamp in the emergency mode. This means that, if the fluorescent lamp could be started with the reactor, but without the normally employed starting methods, an emergency/normal lighting system could be developed for 20 watt or lower wattage lamps and as well as for the overseas market where, with the 220 V AC supply, reactor ballasts are employed for lamps up to the 65 watt level.

It is desirable, therefore, to provide a lighting system wherein a high frequency inverter is compatible with a reactor ballast for operating a gaseous discharge lamp both from the AC mains, and upon the failure thereof, from an auxiliary DC source.

Accordingly, it is an object of the present invention to provide a lighting system including a circuit having a reactor for operating a gaseous discharge lamp during normal conditions from the AC mains, and having a controlled transistor switching inverter for starting the lamp during normal conditions and for starting and operating the lamp during emergency conditions: ie, when the AC line voltage has dropped below a predetermined level.

SUMMARY OF THE INVENTION

In accordance with the present invention, there is provided a circuit for operating a gaseous discharge lamp from a source of AC line voltage, and alternately, from an auxiliary DC electric energy source. Means are provided including a reactor for connection to such an AC line voltage source for operating the lamp at power frequency during normal conditions when the AC line voltage is above a first predetermined level. Means are also provided including an inverter connected to the DC electrical energy source for starting the lamp during normal conditions and for starting and operating the lamp during emergency conditions upon failure of the AC line voltage. The inverter supplies AC electrical energy to the lamp at a frequency substantially higher than the power frequency.

BRIEF DESCRIPTION OF THE DRAWINGS

The accompanying drawing is a detailed schematic representation of the preferred embodiment of the circuit of the present invention.

DESCRIPTION OF THE PREFERRED EMBODIMENT

In accordance with the present invention and referring now to the drawing, there is shown a circuit for operating a gaseous discharge lamp from a source of AC line voltage and, upon the failure thereof, from an auxiliary source of DC electrical energy. Means are provided including an inverter 10 connected to a source of DC electrical energy such as battery 14 for starting the gaseous discharge lamp, such as fluorescent lamp 12, during emergency conditions, inverter 10 supplying AC electrical energy to the lamp 12 at a frequency substantially higher than the AC line power frequency. Means are also provided including a reactor 16 arranged for connection through a pair of input terminals 1 and 2 to a source of AC line voltage, such as for example 220 volts, for operating the lamp 12 at line power frequency, for example, 50 Hz, during normal conditions: that is, when the AC line voltage is above a first predetermined level. Emergency conditions are hereby defined to be when the AC line voltage falls below a second predetermined level.

Inverter 10 is of the tuned type and includes a pair of transistors QA and QB capable of operation in a low-loss switching mode. Means are provided enabling the transistors to operate in the low-loss switching mode and includes inductor L1, a buffer inductance, connected serially with battery 14. A first transformer T1 serves to couple the inverter 10 with the lamp 12 and is resonated with capacitances C101 and C102 to set the operating frequency of the inverter and to establish a sinusoidal output voltage. Inductor L1 is electrically connected at point 22 with a center tap on primary winding P of transformer T1. Means are provided for controlling the inverter 10 and which takes the form of a controller 20, in the preferred embodiment, a 10 pin integrated circuit (IC). Further details of this integrated circuit controller may be had by reference to U.S. Pat. No. 3,921,005 — Watrous, assigned to the assignee of the present invention, and which patent is specifically incorporated herein by this reference. Controller 20 includes means supplying base drive for switching transistors QA and QB at zero collector voltage: that is, when the instantaneous voltage across capacitor C101 is zero. As the primary voltage across transformer T1 varies at fundamental frequency, the voltage at point 22 and hence across inductor L1 varies at twice the fundamental frequency. The current through L1 is DC with a second harmonic component. This same current is alternately carried by the two transistors QA and QB. While the transistors are required to switch collector current, they do so at essentially zero collector voltage with a resultant low power dissipation.

Means are included providing timing information to the controller 20 for effecting switching of the respective transistors QA and QB in step with the natural resonant frequency of the inverter and takes the form of an auxiliary winding S2 magnetically coupled with the primary winding P of first transformer T1. Thus, controller 20, and more specifically, a zero crossing detector set circuit therein, tracks the resonant frequency of first transformer T1 and insures that transistor switching occurs when the voltage across capacitor C101 is zero.

Higher efficiency can be achieved in inverter 10 by making the base drive of the respective transistors proportional to the collector current thereof. To this end there is included means providing a feedback current to the controller 20 to effect transistor base drive proportional to transistor collector current, which in the preferred embodiment, takes the form of a feedback transformer T2. Transformer T2 has a feedback winding D magnetically coupled to the respective collectors of the transistors QA and QB through a pair of windings A and B, respectively. Thus, the power consumed by the controller 20 can be limited to that required to start and control the oscillation of the inverter 10.

A high leakage reactance transformer T3 is provided for connecting the inverter circuit 10 to the 220 volt 50 Hz line voltage source. Circuit means are provided for monitoring the AC source voltage and for coupling the secondary winding S of high reactance transformer T3 with a non-linear load during one half cycle of the AC source voltage to supply charging current for battery 14. Halfwave charging current is supplied to the nonlinear load, battery 14, through diode D101 and is limited in magnitude by the reactance of the transformer T3. Because of this transformer reactance, the sinusoidal voltage at the terminals of winding S is clamped at the battery voltage when diode D101 conducts. On the alternate half cycle, diode D103 conducts halfwave current through indicator lamp 24 and the dual-prong battery plug 26. The battery must be plugged in and the 220 volts AC available to energize lamp 24 indicating that the battery 14 is charging. Using the alternate half cycle reduces the volt-amp rating of the transformer T3. For monitoring AC source voltage, means are provided for coupling secondary winding S of transformer T3 with a linear load during an alternate half cycle. To this end, during the half cycle alternate from that in which the battery 14 is charge, capacitor C104 is charged through diode D102. This provision of a single secondary winding S associated with transformer T3 for providing, in a substantial noninteracting manner, a voltage proportional to the AC voltage and for providing energy to charge battery 14 is disclosed and claimed in application Ser. No. 718,029 — Klett, filed Aug. 6, 1976, and is assigned to the assignee of the present invention. The resultant DC voltage is connected to pin 7 of controller 20 through a linear load comprising resistor divider R104 and R105. The DC voltage at terminal 7 is proportional to the average value of the 50 Hz supply voltage and is not influenced by the aforesaid clamping action of the battery. A zener diode D120 is connected in circuit between diode D102 and capacitor C104 as shown to prevent the battery voltage from battery 14 from keeping inverter 10 biased off. Furthermore, a heater winding H is provided on transformer T3 for heating filament 27 of lamp 12 for assisting in starting the lamp.

Controller 20 includes means for turning on the inverter 10 when the AC line voltage is below the second predetermined level and for turning off the inverter 10 when the AC line voltage is above the first predetermined level. To accomplish these ends, controller 20 also includes a first sensor (in the form of an AC voltage inhibit subcircuit) for sensing the voltage of the AC line source and a second sensor (in the form of a low battery voltage inhibit subcircuit) for sensing the DC battery voltage and includes logic means (in the form of a start-stop logic subcircuit) combining the outputs of the first sensor and the second sensor to enable inverter 10 when the battery voltage is above a predetermined level and the AC voltage is below the second predetermined level and to disable the inverter when the battery voltage is below a predetermined level or the AC line voltage is above first predetermined level.

Operation of the circuit including the inverter 10 during emergency conditions will now be discussed. Assuming that the inverter 10 is enabled to run, controller 20 supplies a small base drive signal to one of the transistors QA and QB. Assuming further that this base drive is applied to QA, transistor QA turns on and current starts to flow through L1, the center tap of the primary P of transformer T1 thence through P and through the A winding of feedback transformer T2, to transistor QA and thence back to the battery 14. The base drive originally supplied to transistor QA is augmented by a current flow from winding D of feedback transformer T2 to the controller 20 to exit from pin 1 thereof thence to flow through the base of transistor QA. This base drive is proportional to the collector current of transistor QA and is designed to be adequate to keep the transistor in saturation.

At some volt-second product, feedback transformer T2 saturates sharply, suddenly reducing the output current of winding D thereof reducing the base drive to transistors QA. A sudden rise in collector-emitter voltage on transistor QA sharply reduces the rate of current rise in this DC circuit. This change in collector current with respect to time reverses the polarity of the S2 winding of transformer T1 and hence the polarity of the voltage on pins 3 and 4 of controller 20. This reversal of polarity signals the controller to change the base drive from transistor QA to transistor QB.

Controller 20 now applies a small amount of base drive through pin 9 to the base of transistor QB, and simultaneously connects the base of QA to the emitter thereof to hasten the turnoff process of transistor QA. Transistor QB starts to conduct as a result of this small base drive signal from the controller and current flows through winding B of feedback transformer T2 to induce a current in winding D thereof and this current is supplied to the controller 20. Controller 20 now supplies this current as base drive out of pin 9 to the base of QB; thus the base drive of QB is proportional to the collector current thereof such that the transistor is kept in saturation.

The P winding of transformer T1 has some leakage reactance and becomes an oscillating system with capacitor C101. This oscillating system goes through the next half-cycle and forces the current flowing through winding B of feedback transformer T2 toward zero and thus the base drive of transistor QB is also reduced. When the voltage across winding P of transformer T1, and thereby the voltage on winding S2 of that transformer, reaches zero, this event is signaled to the controller 20 which again switches the base drive circuitry to transistor QA from QB and connects the base of QB to the emitter thereof to hasten the switching off of transistor QB. The circuit is then ready to go through the next half-cycle with QA conducting.

If switching could be accomplished in absolute zero time, the above described circuit operation would be entirely correct. However, normally the switching is accomplished in periods of less than 1 microsecond and the current flow from battery 14 is essentially at a constant level with a small ripple content. This ripple content is determined by the inductance of L1 which adds or subtracts from the battery voltage as applied to the tap of the primary P of transformer T1. It is this inductor L1 which adjusts the voltage at point 22 in such a way that the transistors may be switched at zero collector voltage. As long as this inductance L1 has a value exceeding a critical value, this circuit will function as described. In the event that both transistors QA and QB are in the "off" state, the rate of current change in L1 forces the voltage thereacross to a value where zener diode D104 starts conducting to limit the voltage applied to the circuit. This clipping action rapidly reduces circuit efficiency and hence is an operational mode to be avoided. Such clipping action can occur momentarily during the starting process or when the inverter is turned off and under these conditions represents an acceptable design operating condition.

The load for the inverter 10 including lamp 12 is connected to a winding S1 of transformer T1. For fluorescent emergency lighting purposes, the ballasting is done by capacitors C102 which determine the load current through the lamp 12. This capacitance in conjunction with C101 and inductance T1P determine the operational frequency of the system (the inductance of the P winding and a capacitance of C101 determine the oscillating frequency when S1 is unloaded). A double capacitive ballast system is used to reduce the voltage across a single unit thus to enhance the reliability of the complete system. The voltage output of the inverter circuit is high enough to instant start 40 watt and 65 watt rapid start lamps under fairly adverse conditions.

As hereinbefore stated, charging of battery 14 is accomplished from winding S of 50 Hz transformer T3. This is the same winding that applied DC energy to the indicator lamp 24. Current flows from the finish of winding S to the plus terminal of the battery 14 thence through diode D101 and to the start of winding S. In the alternate half-cycle, current flows from the start of winding S through diode D103 to the lamp 24 thence to the two-prong plug 26 and on to the finish of winding S of transformer T3. If the battery is not plugged in, the indicator lamp is not energized signifying that the system needs attention. Also, if the indicator lamp or its associated circuit becomes defective (open or shorted), the main charging cycle for the battery is uninterrupted but the lamp 24 does not come on again, therefore signifying that the system requires attention; the system however remains operational. In the event that the battery 14 is not connected in circuit and line voltage is exceedingly high, there exists the possibility that this voltage would be applied directly across pins 3 and 10 of the controller 20. Such a high voltage could be destructive to the IC; taking advantage of the current limiting characteristics of the winding S, zener diode D104 conducts so as to clip the peaks of this voltage wave through inductor L1 thereby to protect the IC controller 20. This means that the zener diode D104 must be sized so as to dissipate this expected energy.

Winding S of transformer T3 also supplies a half-wave rectified signal over a diode D102 and a zener D120 to filter capacitor C104 and voltage divider network R104 and R105 thence to apply a signal to pin 7 of controller 20. As this half wave rectified voltage decreases with decreasing line voltage, it finally reaches a point where the controller 20 is allowed to function; this is the inverter turn-on point. Because of the nature of the half-wave rectified signal and the differential in the IC controller 20, a hysteresis is inherent in the IC operation. Thus, the inverter "turn off" point as controlled by the AC line voltage will be higher than the inverter "turn on" point. By ajusting the ratios of R104 and R105, either the inverter "turn on" or "turn off" point may be controlled over quite a wide range; however, both inverter "turn on" and "turn off" points may not be separately controlled because of the relatively fixed value of this built-in hysteresis. DC battery voltage or charging transformer winding voltage is applied between pins 3 and 10 of controller 20. This same voltage is applied across voltage divider R102 and R103 to pin 5 (second sensor) of the IC controller 20. When the voltage at pin 5 drops below a value determined by the construction of the IC, the controller 20 stops driving transistors QA and QB thus shutting down the inverter 10. This voltage is normally set at approximately one half of the nominal battery voltage but it may be adjusted by the ratio of resistors R102 and R103. A certain amount of hysteresis is implemented in the way this control function is done in the IC controller. This hysteresis provides clean on/off switching of the inverter. After the inverter switches off, the voltage rises causing it to turn on again. This provides repeated flashing of the fluorescent lamp which in turn indicates that the battery is discharged.

As stated above, in the event that the battery is not connected, the voltage across pins 3 and 10 of controller 20 will rise to a point which is the peak of the AC wave generated in winding S of 50 Hz transformer T3. This voltage might be excessive for the integrated circuit and therefore, when the voltage across pins 3 and 10 of controller 20 exceeds approximately 30 volts, an internal regulator in the controller 20 shuts down the function of this controller in such a way as to minimize the voltage stress on various components of this integrated circuit. Thus, the application of too high a voltage to this inverter will inhibit its operation. This enhances the reliability of the system in that it distributes electrical stress better in the integrated circuit. Since the voltage occurring during operation across the transistors QA and QB is double the DC battery supply voltage, by shutting off these transistors under abnormally high voltage conditions, the voltage is reduced simply to battery voltage, reducing the probability that the transistors QA and QB might fail under such highly abnormal conditions. If the voltage across the battery 14 rises above the zener voltage of D104, zener diode D104 starts to conduct and voltage regulation will be accomplished by means of the inherent impedance of winding S of transformer T3. The voltage applied to the circuit is thus limited to a safe value under quite severe over-voltage conditions. In the event the voltage continues to rise because of a wrong voltage applied to the primary winding P of transformer T3 and with no battery in circuit, the most probable mode of failure of zener diode D104 is to short and this then crowbars the DC supply voltage to the inverter.

Operation of the circuit will now be discussed for normal conditions: that is, when the AC line voltage is above a first predetermined level. Assuming that AC line voltage has already been applied to input terminals 1 and 2, a switch 28 is closed thereby allowing line voltage to be applied across the lamp 12 through reactor 16. Since no push-to-start button or voltage breakdown type of starting device has been supplied for starting lamp 12, in accordance with the present invention, means are provided for overriding the inverter controller for turning on the inverter to start the lamp during such normal conditions and for turning off the inverter after the lamp is operating from the AC line voltage. In the preferred embodiment this includes lamp voltage monitoring means in the form of a voltage breakdown device such as zener diode D122 connected serially with a pair of diodes D124 and D126 and a resistor R107 across the lamp 12. A light emitting diode D130 is also connected serially with this string and a capacitor C107 is connected in parallel with the diode string. The application of line voltage across the lamp 12 causes zener diode D122 to conduct thereby allowing the LED D130 to become operative. Photons emitted from the LED D130 effect the turning on of a phototransistor QP thereby allowing the discharge of the line monitoring capacitor C104 through a current limiting resistor R108. Since the integrated circuit controller 20 sees a loss of line voltage at pin 7, the inverter is allowed to turn on thereby effecting starting of the lamp 12. Upon lamp starting, after lamp voltage drops to the normal run level, zener diode D122 stops conducting thereby effecting the turning off of the LED and the phototransistor QP. Means are provided for assuring operation of inverter 10 for a predetermined time after lamp voltage reaches a normal run level. In the preferred embodiment, this includes RC timing means, including resistor R109 and capacitor C104, which functions to provide a time delay of predetermined value. Capacitor C104 then gradually charges over a charging resistor D109 and after a short delay, pin 7 of the conroller 20 senses an appropriate voltage and turns off the inverter 10. The choice of value of resistor R109 in combination with capacitor C104 may be varied to effect longer or shorter charging time of the capacitor. Thus, the amount of delay time before the inverter turns off may be controlled to assure the adequate hot-spotting of the lamp to insure its long life. It should be noted that the LED D130 and the phototransistor QP form an optocoupler which advantageously may be provided in the form of an integrated circuit.

As can be seen, lamp 12 may be turned on and off by opening and closing switch 28 without activating the inverter 10 except for lamp starting. The inverter therefore serves to start the lamp during normal conditions and also to start and operate the lamp during emergency conditions: upon failure of the AC line voltage.

With the arrangement as shown in the drawing, a lamp socket may function as a safety disconnect lampholder. As shown, means are provided in the circuit for connection to lamp 12 and include a first pair of terminals 32, 32' and a second pair of terminals 34, 34'. Terminal 32' is connected to ground through input terminal 2. When lamp 12 is removed from the circuit, the lamp voltage monitoring subcircuit including zener diode D122 is open circuited since its connection to ground through terminal 32 and lamp filament 30 is broken. As a result, during normal conditions, (when AC line voltage is above a predetermined level) the inverter 10 will not turn on. As a further example, if the filament 27 end only of the lamp 12 is removed from the circuit, an individual coming into contact with the lamp pins connected to filament 27 will effectually contact ground since filament 30 is grounded; no electrical shock will result. If the filament 30 end only of lamp 12 is removed from the circuit, the inverter will not run and an individual contacting the lamp pins connected to filament 30 will receive no electrical shock since the lamp will not ionize without starting assistance from the inverter. Should lamp 12 be removed partially from the circuit during emergency conditions (when inverter 10 is operational), an individual contacting the lamp pins connected to filament 30 will be protected from severe electrical shock due to the fact that winding S1 of transformer T1 has been designed with a very low capacitance to ground thereby limiting current flow. This reduced capacitance to ground has been accomplished primarily by keeping the winding physically small and as electrically decoupled as possible from the outer case and other windings.

As stated hereinbefore, the control circuit 20 may be fabricated as a single, monolithic, integrated circuit. In this form, the use of slaved current sources is particularly practical. In the embodiment described in the aforementioned U.S. Pat. No. 3,921,005, the current consumption and hence, power dissipation, in the controller 20 is essentially independent of battery voltage over the operating range. Furthermore, the control circuit can be matched to different power level inverters by scaling the currents in the control circuit.

The lighting circuit shown in the drawing has been constructed and has operated satisfactorily with components having the following values:

| | |
|---|---|
| Transistors QA, QB | D44C10 |
| Transformer T1 | Primary winding P, 50 turns, .0253" wire |
| | Load winding S1, 1130 turns, .0063" wire |
| | Feedback winding S2, 3 turns, .0063" wire |
| Transformer T2 | Collector windings A and B, 6 turns .0126" wire |
| | Output winding D, 240 turns, .0071" wire |
| Transformer T3 | Primary winding P, 3332 turns, .0045" wire |
| | Secondary winding S, 290 turns, .0080" wire |
| | Heater winding H, 66 turns, .01060" wire |
| Inductor L1 | 73 turns, .032" wire |
| Lamp 12 | F40 T12 φ RS |
| Battery 14 | 7 cells, ½ D, high temp Ni - Cd |
| Reactor 16 | KNOBEL #40-5340 |
| Resistor R101 | 15K ohm ¼ W |
| (all 5%) R102 | 22K ohm ¼ W |
| R103 | 22K ohm ¼ W |
| R104 | 100K ohm ¼ W |

-continued

| | |
|---|---|
| R105 | 220K ohm ¼ W |
| R107 | 100K ohm 2 W |
| R108 | 680K ohm ¼ W |
| R109 | 18K ohm ¼ W |
| Capacitor C101 | .22 uf 50 V AC, 10% |
| C102 (2) | 5100 pf 400 V, 5% |
| C104 | 2.0 uf 50 V, 20% |
| C105 | .01 uf 100 V, 20% |
| C107 | 100 pf 500 V AC, 10% |
| Diode D101, D102, D103, D126, D124 | 1N 4004 1A., 400 V |
| Diode D111, D115 | DA 1701, .2A, 25 V |
| Zener Diode D104, D120 | 20 V, 1 W 5% |
| Zener Diode D122 | 150 V DC, 1 W, 5% |
| LED D130 ⎫ Phototransistor Qp ⎭ | IC Photocoupler H11A5(GE) |

Control circuit 20 has been build and has operated satisfactorily in both discrete circuit form and as a monolithic IC; See U.S. Pat. No. 3,921,005 for details.

The illustrated embodiment was designed to operate a 40 W rapid start fluorescent lamp from a 220 V, 50 Hz source an, in the emergency mode at 5500 Hz, from a battery (for 100 minutes). This circuit has also successfully operated a 65 watt rapid start fluorescent lamp. Another circuit has been built and has operated a 20 W rapid start lamp from a 120 V, 60 Hz AC source and from a battery; this circuit had the same component values as above, except for the following:

| | |
|---|---|
| Resistor R107 | 47 K ohm, 2 W |
| R109 | 10 K ohm, ¼ W |
| Transformer T3 | Primary P 1690 turns .0063" dia. wire |
| | Secondary S 340 turns .0063" dia. wire |
| | H 80 turns .0126" dia. wire |
| Zener Diode D122 | 100 V, ¼ W |
| LED D130 ⎫ Phototransistor QP ⎭ | IC Photocoupler - H11A5 (GE) |
| Capacitor C107 | .001 uf, 200 V |
| C108 (not shown) | .001 uf, 50 V (between base of phototransistor and pin 10 of controller 20) |
| Reactor 16 | 89G988 (GE) |

While an embodiment and application of this invention have been shown and described it will be apparent to those skilled in the art that modifications are possible without departing from the inventive concepts herein described. The invention, therefore, is not to be restricted except as is necessary by the prior art and the spirit of the appended claims.

What is claimed is:

1. A circuit for operating a gaseous discharge lamp, the circuit comprising:

means including a reactor arranged for connection to a source of AC line voltage for operating the lamp at power frequency during normal conditions when the AC line voltage is above a first predetermined level;

means including an inverter connected to a source of DC electrical energy for starting the lamp during normal conditions and for starting and operating the lamp during emergency conditions when the AC line voltage is below a second predetermined level, the inverter supplying AC electrical energy at a frequency substantially higher than the power frequency;

means for controlling the inverter including a first sensor responsive to a signal related to AC line voltage for turning on the inverter when the AC line voltage is below the second predetermined level and for turning off the inverter when the AC line voltage is above the first predetermined level; and overriding means for turning on the inverter to start the lamp during normal conditions and for turning off the inverter after the lamp is operating from the AC line voltage;

the overriding means including means for monitoring voltage across the lamp and including means for effecting inverter turn-on when voltage across the lamp is above a predetermined level and for effecting inverter turn-off when the lamp becomes operational and the voltage thereacross is below another predetermined level.

2. The circuit of claim 1 wherein the means for monitoring includes a voltage breakdown device which upon conduction allows the activation of an optocoupler to effect removal of the signal from the first sensor thereby to turn on the inverter.

3. The circuit of claim 1 further comprising means for connection to the lamp including first and second pairs of terminals, one of the first pair of terminals being arranged for connection to ground, the voltage monitoring means being connected at one end to the second pair of terminals and at the other end to a second of the first pair of terminals such that, during normal conditions, when the lamp is removed from contact with the first pair of terminals, the voltage monitoring means is open-circuited and cannot function to effect inverter turn-on, thereby serving as a lamp safety disconnect.

4. A circuit for operating a gaseous discharge lamp, the circuit comprising:

means including a reactor arranged for connection to a source of AC line voltage for operating the lamp at power frequency during normal conditions when the AC line voltage is above a first predetermined level;

means including an inverter connected to a source of DC electrical energy for starting the lamp during normal conditions and for starting and operating the lamp during emergency conditions when the AC line voltage is below a second predetermined level, the inverter supplying AC electrical energy at a frequency substantially higher than the power frequency;

means for controlling the inverter including a first sensor responsive to a signal related to AC line voltage for turning on the inverter when the AC line voltage is below the second predetermined level and for turning off the inverter when the AC line voltage is above the first predetermined level;

overriding means for turning on the inverter to start the lamp during normal conditions and for turning off the inverter after the lamp is operating from the AC line voltage, and means for assuring inverter operation for a predetermined time after a lamp voltage reaches a normal run level.

5. The circuit of claim 4 wherein the means for assuring includes RC timing means providing a time delay in restoring the signal to the first sensor whereby inverter operation is assured for a predetermined time after lamp voltage reaches the normal run level.

* * * * *